United States Patent
Chahal et al.

(10) Patent No.: US 7,859,658 B2
(45) Date of Patent: Dec. 28, 2010

(54) THIN MICROPOLARIZING FILTER, AND A METHOD FOR MAKING IT

(75) Inventors: Premjeet Chahal, Plano, TX (US); Francis J. Morris, Dallas, TX (US)

(73) Assignee: Raytheon Company, Waltham, MA (US)

( * ) Notice: Subject to any disclaimer, the term of this patent is extended or adjusted under 35 U.S.C. 154(b) by 788 days.

(21) Appl. No.: 11/467,731

(22) Filed: Aug. 28, 2006

(65) Prior Publication Data

US 2006/0284056 A1 Dec. 21, 2006

Related U.S. Application Data

(62) Division of application No. 10/382,745, filed on Mar. 5, 2003, now Pat. No. 7,098,442.

(51) Int. Cl.
*G02B 5/20* (2006.01)
(52) U.S. Cl. .................. 356/256; 250/225; 359/885
(58) Field of Classification Search ............. 356/256; 250/225; 359/486
See application file for complete search history.

(56) References Cited

U.S. PATENT DOCUMENTS

| | | | | |
|---|---|---|---|---|
| 5,825,528 | A * | 10/1998 | Goossen | 359/291 |
| 5,861,226 | A * | 1/1999 | Horne et al. | 430/5 |
| 6,122,103 | A | 9/2000 | Perkins et al. | 359/486 |
| 6,316,151 | B1 | 11/2001 | Kim et al. | 430/5 |
| 6,788,461 | B2 * | 9/2004 | Kurtz et al. | 359/486 |
| 6,844,971 | B2 | 1/2005 | Silverstein et al. | 359/486 |
| 2001/0052640 | A1 | 12/2001 | Sekimoto | 257/678 |
| 2002/0001964 | A1* | 1/2002 | Choi | 438/719 |
| 2004/0125449 | A1 | 7/2004 | Sales | 359/486 |

FOREIGN PATENT DOCUMENTS

| | | | |
|---|---|---|---|
| EP | 1286187 | * | 2/2003 |
| WO | EP 1 263 028 A1 | | 12/2002 |

OTHER PUBLICATIONS

Vossen et al. "Thin Film Processes II", pp. 537-538, Elsevier 1991.*
Gontijo et al. "Nonlinear Single Wavelength Polarization Switching In InGaAs/InP Quantum Well Waveguides". Appl. Phys. Lett. 66 (15), Apr. 10, 1995.*
David W. Keith, et al., "Free-standing gratings and lenses for atom optics", 8257b Journal of Vacuum Science & Technology: Part B, American Institute of Physics, New York, US, vol. 9, No. 6 (pp. 2846-2850), Nov. 1, 1991.

(Continued)

*Primary Examiner*—Tarifur Chowdhury
*Assistant Examiner*—Tara S Pajoohi
(74) *Attorney, Agent, or Firm*—Baker Botts L.L.P.

(57) ABSTRACT

A polarizing filter includes a portion with a filtering layer having a plurality of openings extending therethrough, where this portion has a maximum physical thickness in a radiation travel direction which is less than approximately one wavelength of the radiation being filtered. A method of making the filter includes: forming a filtering layer over a substrate; creating a plurality of openings through a portion of the filtering layer; and separating the filtering layer from the substrate.

10 Claims, 3 Drawing Sheets

OTHER PUBLICATIONS

T. Wilhein, et al., "A lit grating spectrograph for quantitative soft x-ray spectroscopy", Review of Scientific Instruments, American Institute of Physics, US; vol. 7, No. 3 (pp. 1694-1699), Mar. 3, 1999.

Earl E. Scime, et al., "Extreme-ultraviolet polarization and filtering with gold transmission grating", Applied Optics, Optical Society of America, Washington, US (pp. 648-654), Feb. 1, 1995.

Kenneth Mason Publications, "Wire Grid for Fabrication of Very-Fine Wires", Research Disclosure, No. 337 (p. 414), May 1, 1992.

Junpeng Guo, et al., "*Fabrication of thin-film micropolarizer arrays for visible imaging polarimetry*", Applied Optics, Optical Society of America, Washington, US, vol. 39, No. 10 (pp. 186-1492), Apr. 1, 2000.

Tohru Doumuki, et al., *An aluminum-wire grid polarizer fabricated on a gallium-arsenide photodiode:*, Applied Physics Letters, American Institute of Physics, New York, US, vol. 71, No. 5; (pp. 686-688), Aug. 4, 1997.

Gregory P. Nordin, "*Micropolarizer array for infrared imaging polarimetry*", Journal of the Optical Society of America, vol. 16, No. 5 (pp. 1168-1174), May 5, 1999.

J.H.W.G. den Boer, et al, "*Improved polarizer in the infrared: two-wire-grid polarizers in tandem*", Optics Letters, Optical Society of America, Washington, US (pp. 800-802), Apr. 1, 1995.

J.T.M. van Beek, "*Nanoscale freestanding gratings for ultraviolet blocking filters*", Journal of Vacuum Science & Technology: Part B, American Vacuum Society, (pp. 3911-3916), Dec. 1998.

Notification of Transmittal of the International Search Report and the Written Opinion of the International Searching Authority for International Application No. PCT/US2004/004610, filed Feb. 17, 2004 (15 pages), Feb. 17, 2004.

\* cited by examiner

THIN MICROPOLARIZING FILTER, AND A METHOD FOR MAKING IT

RELATED APPLICATIONS

This application is a divisional of U.S. application Ser. No. 10/382,745, filed Mar. 5, 2003 entitled "Thin Micropolarizing Filter, and a Method for Making It," now U.S. Pat. No. 7,098,442.

TECHNICAL FIELD OF THE INVENTION

This invention relates in general to filtering techniques and, more particularly, to micropolarizing filters and methods of making them.

BACKGROUND OF THE INVENTION

Detectors for infrared radiation or visible radiation typically include a substrate having on one side thereof a two-dimensional array of pixel detectors, arranged in rows and columns. In certain applications, it is desirable to polarize the radiation traveling to the pixel detectors. For this purpose, a micropolarizing filter can be provided over the array of pixel detectors.

A typical micropolarizing filter includes a rigid substrate having a thickness of approximately 600 microns, and a metal layer on one side of the substrate. The substrate is made of a material through which the radiation of interest can pass. For example, in the case of infrared radiation, the substrate can be gallium arsenide (GaAs). The metal layer can be any one of a number of different types of metal. The metal layer is typically a thin layer of gold, with a thickness of approximately 1 micron, and with a plurality of groups of parallel slots extending through it. Each group of slots corresponds to and is aligned with a respective pixel detector, and effects polarization of radiation traveling to that pixel detector. While pre-existing filters of this type have been generally adequate for their intended purposes, they have not been satisfactory in all respects.

For example, visible radiation and infrared radiation have wavelengths falling in a range from approximately 1 micron to 12 microns. Since the substrate is many times thicker than a wavelength of the radiation of interest, the substrate can produce undesirable optical effects. For example, the substrate typically causes a degree of scattering and/or defocusing of the radiation, such that a portion of the radiation traveling toward any given pixel detector ends up being misdirected toward one or more neighboring pixel detectors. As a result, there is a degree of optical cross-talk between the detectors. The large thickness of the substrate can affect the focal point of the detector front lens, and can also cause a significant degree of optical loss within the filter, such that the filter is not very efficient.

Another consideration is that the substrate has a relatively high index of refraction. Consequently, in order to achieve an effective degree of polarization, which is commonly known as a high extinction ratio, an anti-reflection (AR) coating is needed on each side of the substrate, and the pitch between the adjacent slots in the metal layer needs to be relatively small. In order to achieve a small pitch, fine lithography is needed for fabrication of the metal layer, which in turn increases the fabrication cost.

A further disadvantage of the relatively thick GaAS substrate is that it has limited optical transparency. Therefore, when the filter is being installed on a detector array, the detectors cannot easily be seen through the filter, and it is difficult to achieve accurate alignment between the filter and the detectors. In fact, it is fairly common to incur the cost and effort of using a laser to ablate alignment holes in the substrate, in order to be able to visually see through it for purposes of achieving accurate alignment with the substrate.

SUMMARY OF THE INVENTION

One form of the present invention involves an apparatus that includes a polarizing filter having a filtering layer which extends approximately perpendicular to a radiation travel direction, and which has a portion with a plurality of openings therethrough in the radiation travel direction. The polarizing filter has, throughout a region thereof corresponding to the portion of the filtering layer, a maximum physical thickness in the radiation travel direction which is less than approximately one wavelength of the radiation to be filtered.

A different form of the invention involves a method of making a polarizing filter, including: providing a substrate; forming a filtering layer over the substrate; creating a plurality of openings through a portion of the filtering layer; separating the filtering layer from the substrate; and configuring the polarizing filter so that, after it is separated from the substrate, the polarizing filter has throughout a region thereof corresponding to the portion of the filtering layer a maximum physical thickness in the radiation travel direction which is less than approximately one wavelength of the radiation to be filtered.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
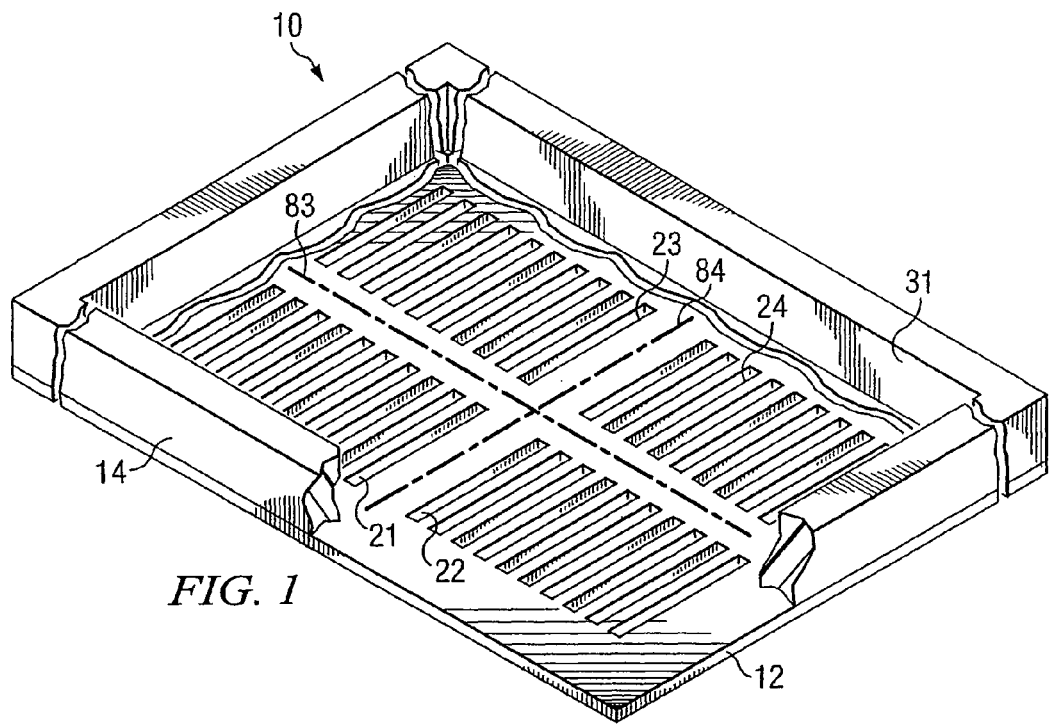
FIG. 1 is a diagrammatic fragmentary perspective view of a micropolarizing filter which embodies aspects of the present invention.

FIG. 1 is a diagrammatic fragmentary perspective view of a micropolarizing filter 10 which embodies aspects of the present invention. The filter 10 includes a metal plate 12, and an annular spacer 14 which is supported on and extends along a peripheral edge of the plate 12.

In the embodiment of FIG. 1, the metal plate 12 is made from gold, and has a thickness of approximately 1 micron. However, the plate 12 could alternatively be made from a different metal, from multiple layers of different metals, from a metal alloy, or from any other suitable material. The central portion of the plate 12, which is the portion disposed inwardly of the spacer 14, has a plurality of slots or openings extending through it. These slots are arranged in several groups, and the groups are arranged in a two-dimensional array of rows and columns.

FIG. 1 shows four of the many groups of slots, including a group of slots 21, a group of slots 22, a group of slots 23, and a group of slots 24. The slots in each group extend parallel to each other. In FIG. 1, the slots in all four groups are shown extending parallel to each other. However, it would alternatively be possible for the parallel slots in one group to extend in a different direction than the parallel slots in a different group. For example, the parallel slots 22 could all extend at an angle of 45° with respect to the parallel slots 21, and the parallel slots 24 could all extend at an angle of 90° with respect to the parallel slots 21.

The spacer 14 is made from a polymer material of a type known in the art, which is organic. However, the spacer 14 could alternatively be made from any other suitable material, including an inorganic material. With reference to the orientation of the spacer 14 in FIG. 1, the spacer 14 has a vertical thickness of approximately 8 microns. Thus, the plate 12 and spacer 14 together have a combined vertical thickness of approximately 9 microns. Although the spacer 14 is described here as an annular part, it can alternatively be viewed as a layer of polymer material which has a rectangular opening or window 31 provided through it.

Figure 2:
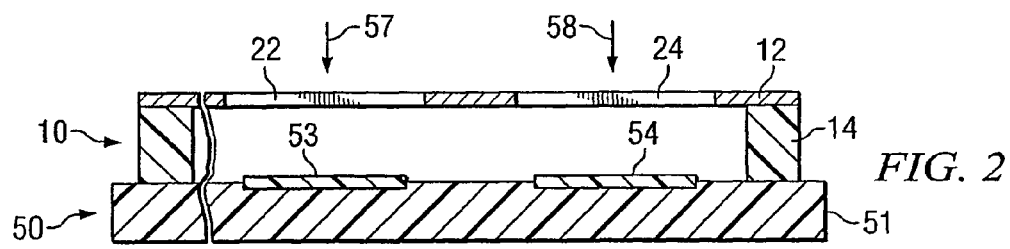
FIG. 2 is a diagrammatic fragmentary sectional side view of an apparatus which includes an integrated circuit with the filter of FIG. 1 installed thereon.

FIG. 2 is a diagrammatic fragmentary sectional view of an integrated circuit 50, with the filter 10 of FIG. 1 mounted on it. In FIG. 2, the filter 10 has an orientation which is physically inverted from the orientation shown in FIG. 1. The integrated circuit 50 is an infrared detector of a type commonly known as a focal plane array (FPA), but could alternatively be some other type of radiation detection device. The integrated circuit 50 includes a substrate 51 made of a material such as gallium arsenide. The integrated circuit 50 includes, on an upper side of the substrate 51, a two-dimensional array of infrared pixel detectors, two of these pixel detectors being visible at 53 and 54. Each pixel detector is disposed below and aligned with a respective group of the slots through the plate 12 of the filter 10.

Infrared radiation, which is indicated diagrammatically in FIG. 2 by two arrows 57 and 58, passes through each group of slots in the plate 12 in order to reach a respective pixel detector, such as the detectors 53-54. As the radiation passes through the slots, the radiation is polarized. Typically, the radiation approaching the filter 10 will be circularly polarized radiation, which may be viewed as having first and second components which respectively extend perpendicular to and parallel to the slots of a given group. As the radiation passes through the slots in that group, the second component is reduced in magnitude. The efficiency of the polarization, which is sometimes referred to as the extinction ratio of the filter, is the ratio of the first component to the second component after filtering.

In FIG. 2, the filter 10 is used for filtering infrared radiation, where typical wavelengths of the radiation are in the range of 4 to 12 microns. However, with minor adjustments to the widths and pitch of the slots in the plate 12, the filter 10 could alternatively be used to filter any wavelength selected from a relatively wide range of wavelengths, one example of which is visible radiation, where wavelengths are in the range of about 1 to 2 microns. As discussed above, the central portion of the plate 12, which has the slots and effects filtering, has a thickness of about 1 micron. Consequently, the portion of the filter which actually does the filtering has a total thickness which is less than approximately one wavelength of the radiation being filtered.

As a result, the filter 10 is capable of filtering in an effective and efficient manner, but without certain undesirable effects that were present in pre-existing filters. For example, since the filter 10 does not have an extremely thick substrate in the region of the slots, it is not subject to scattering and/or defocusing of radiation in a manner causing a portion of the radiation that should be directed onto a single pixel detector to be misdirected onto one or more adjacent pixel detectors. Since these undesirable effects are avoided, the pitch of the slots in the plate 12 can be larger than the small pitch needed in pre-existing filters, but without sacrificing performance. Where the pitch is larger, the plate 12 can be fabricated more easily and cheaply.

Figure 3:
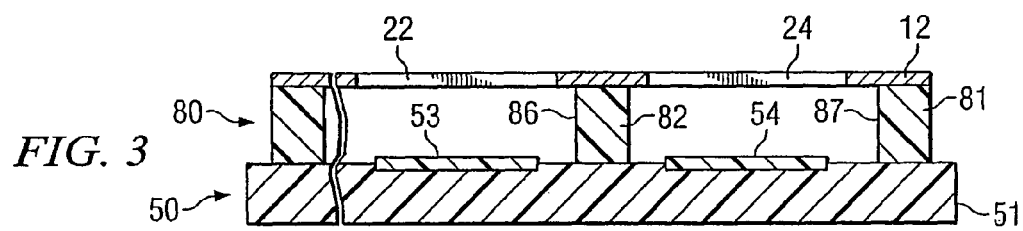
FIG. 3 is a diagrammatic fragmentary sectional side view similar to FIG. 2, but showing a micropolarizing filter which is an alternative embodiment of the filter of FIGS. 1 and 2.

FIG. 3 is a diagrammatic fragmentary sectional side view similar to FIG. 2, but showing the integrated circuit 50 with a different micropolarizing filter 80, where the filter 80 is an alternative embodiment of the filter 10 of FIGS. 1 and 2. The filter 80 includes a plate 12 which is identical to the plate 12 shown in FIGS. 1-2. The filter 80 also includes a spacer 81, but the spacer 81 is slightly different from the spacer 14 of FIGS. 1-2.

More specifically, the spacer 81 includes an annular outer portion, which is similar to the spacer 14. But the spacer 81 also includes a network of ribs that each extend in one of two perpendicular directions, one such rib being shown at 82. Each rib extends between different groups of slots in the plate 12. Thus, for example, the rib 82 of FIG. 3 extends along a path indicated diagrammatically by a broken line 83 in FIG. 1, and a further (not-illustrated) rib extends along a path indicated diagrammatically by a broken line 84. The ribs add rigidity and mechanical strength to the plate 12 of the polarizing filter 10. In addition, the ribs reduce or eliminate cross-talk between portions of the radiation traveling to adjacent pixel detectors.

Although the spacer 81 can thus be viewed as an annular part with a network of ribs, the spacer 81 can alternatively be viewed as a single layer of material having a two-dimensional array of rectangular openings or windows through it, two of these windows being designated by reference numerals 86 and 87 in FIG. 3, where each such opening or window is aligned with a respective group of slots in the plate 12 and a respective pixel detector on the substrate 50.

Figure 4:
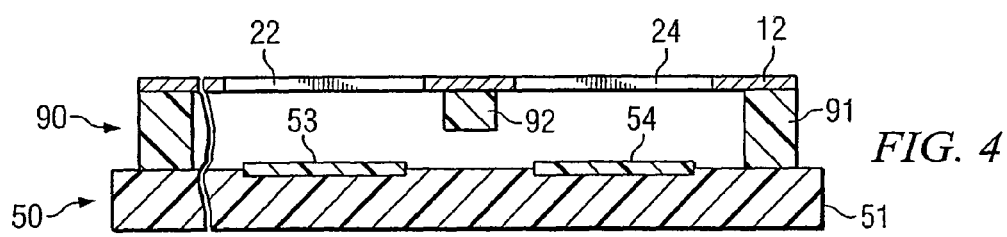
FIG. 4 is a diagrammatic fragmentary sectional side view similar to FIG. 2, but showing a micropolarizing filter which is an alternative embodiment of the filter of FIG. 3.

FIG. 4 is a diagrammatic fragmentary sectional side view similar to FIG. 3, but showing the integrated circuit 50 with a different micropolarizing filter 90. The filter 90 is an alternative embodiment of the filter 80 of FIG. 3. The filter 90 is effectively identical to the filter 80, except that the network of ribs has a smaller vertical height than the surrounding annular portion. For example, it will be noted that the rib 92 in FIG. 4 has a smaller vertical height than the rib 82 in FIG. 3. As mentioned above, the ribs add rigidity and mechanical strength, and also reduce or eliminate cross-talk between adjacent pixel detectors.

Figure 5:
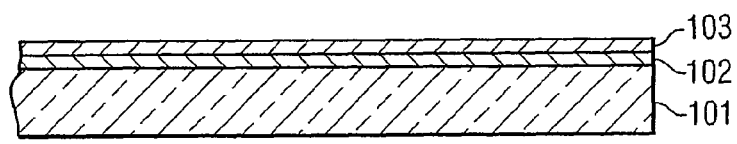
FIGS. 5 through 9 are diagrammatic fragmentary sectional side views showing respective successive stages in a method for fabricating the micropolarizing filter of FIG. 1.

A method for making the micropolarizing filter 10 of FIG. 1 will now be described, with reference to FIGS. 5 through 9, which are diagrammatic fragmentary sectional side views showing successive intermediate stages in the process of fabricating the filter 10. With reference to FIG. 5, the process begins with a silicon semiconductor substrate 101. An aluminum sacrificial layer 102 is deposited on the top surface of the substrate 101, and then a gold layer 103 is deposited on top of the sacrificial layer 102. As will become evident from the following discussion, the gold layer 103 is converted into the gold plate 12 of FIG. 1. As also discussed above, the disclosed embodiment uses gold for the layer 103, but it would alternatively be possible to use a different metal, multiple layers of different metals, a metal alloy, or any other suitable material.

Figure 6:
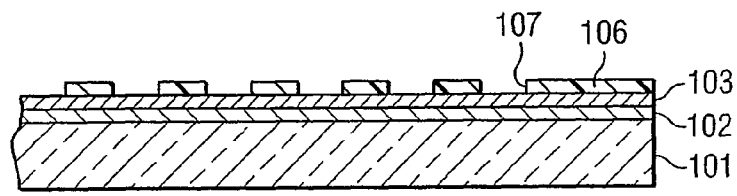
Figure 7:
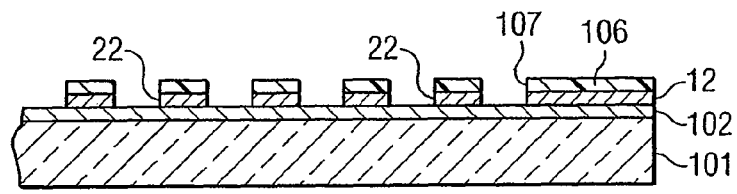
Figure 8:
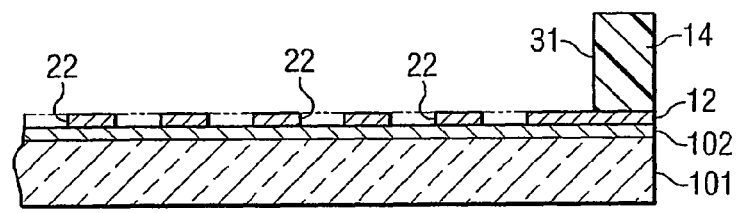
Figure 9:
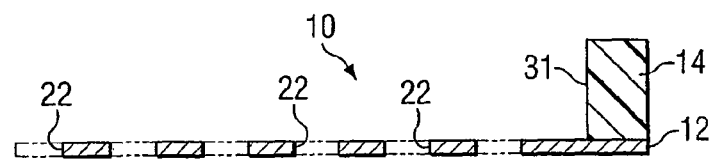

Referring to FIG. 6, a layer 106 of a known photoresist is deposited over the gold layer 103. The photoresist 106 is then patterned and etched to create a plurality of slots through it, one of which is designated by reference numeral 107. The slots 107 in the photoresist 106 define where slots are to be formed through the gold layer 103 by etching. Next, the gold layer 103 is etched through the slots in the photoresist 106, in order create corresponding slots in the gold layer 103, as shown in FIG. 7. For example, it will be noted that the slot 107 in the photoresist 106 resulted in the creation of one of the slots 22 (FIGS. 1 and 7). This etching of the gold layer is effected using ion milling and/or reactive ion etching (RIE), but could alternatively be effected using some other suitable technique. The etching of the gold layer 103 effectively converts the layer 103 into the plate 12 of FIG. 1.

The photoresist 106 is then removed, using techniques known in the art. Next, with reference to FIG. 8, a layer of a polymer material is deposited over the gold plate 12, and then a rectangular window 31 is etched through the polymer layer using known techniques, in order to leave the annular spacer 14.

Alternatively, it would be possible to make the spacer from a metal. For example, the spacer could be formed by (1) depositing a layer of a photoresist over the gold plate 12, (2) etching away the peripheral edges of the photoresist to expose the peripheral edges of the plate 12, (3) thereafter plating metal on the peripheral edges of the plate 12 to a desired thickness, in order to form the annular apacer, and (4) then removing the remaining photoresist from the central portion of the plate 12.

Referring again to FIG. 8, the next step after forming the polymer spacer 14 is to etch away the sacrificial aluminum layer 102 using known techniques, in order to separate the substrate 101 from the plate 12. Up to this point, the substrate 101 provided mechanical support and rigidity during the fabrication process, but once the spacer has been formed it is no longer needed. The substrate 101 is not damaged by the process described above, and can subsequently be reused to successively fabricate a number of additional filters similar to the filter 10.

Although the process shown in FIGS. 5-9 uses the sacrificial layer 102 between the substrate 101 and the gold layer 103, it would alternatively be possible to omit the sacrificial layer 102 and form the gold layer 103 directly on the substrate 101. The rest of the process would still be the same as described above, except for the step of separating the substrate 101 from the plate 12. In particular, the substrate 101 would have to be etched in order to effect this separation, which would have the effect of partially or completely destroying the substrate 101. As a result, it would not be possible to reuse the substrate 101 to make additional similar filters.

Figure 10:
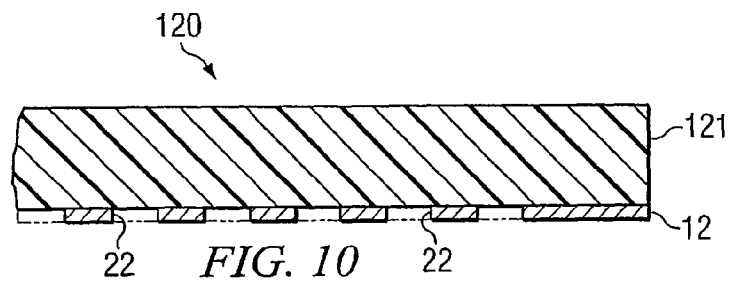
FIGS. 10 through 14 are diagrammatic fragmentary sectional side views which each show a micropolarizing filter that is a respective different alternative embodiment of the filter of FIG. 1.

FIG. 10 is a diagrammatic fragmentary sectional side view of a micropolarizing filter 120 which is an alternative embodiment of the filter 10 of FIG. 1. The filter 120 includes a gold plate 12, which is identical to the gold plate 12 shown in FIG. 1. The filter 120 also includes a spacer 121, which is made from the same polymer material as the spacer 14 of FIG. 1. The spacer 121 differs from the spacer 14 only in that the spacer 14 of FIG. 1 has the rectangular window 31 extending through it, whereas the spacer 121 does not have a window through it. The spacer 121 is transparent to the type of radiation being filtered, which in the embodiment of FIG. 10 is infrared radiation.

The spacer 121 has a thickness of approximately 8 microns, and the gold plate 12 has a thickness of approximately 1 micron. Thus, radiation passes through a portion of the filter 120 which has a total thickness of approximately 9 microns. For purposes of filtering infrared radiation with relatively long wavelengths of approximately 12 microns, the filter 120 has an effective thickness which is less than one wavelength of the radiation being filtered. Thus, even though the radiation travels through the spacer 121, the spacer 121 is optically negligible.

Figure 11:
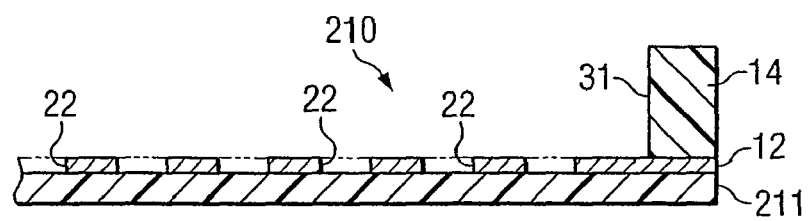

FIG. 11 is a diagrammatic fragmentary sectional side view of a micropolarizing filter 210 which is another alternative embodiment of the filter 10 of FIG. 1. The filter 210 has a portion which is identical to the filter 10 of FIG. 1, in that it includes the plate 12 and spacer 14. The filter 210 also has a layer 211 which is made of a dielectric material such as silicon dioxide or silicon nitride, and which is disposed on a side of the plate 12 opposite from the spacer 14. The dielectric layer 211 is 2 to 3 microns thick, is transmissive to the type of radiation which is to be filtered, and does not have slots through it. The dielectric layer 211 adds rigidity and mechanical strength to the plate 12.

Figure 12:
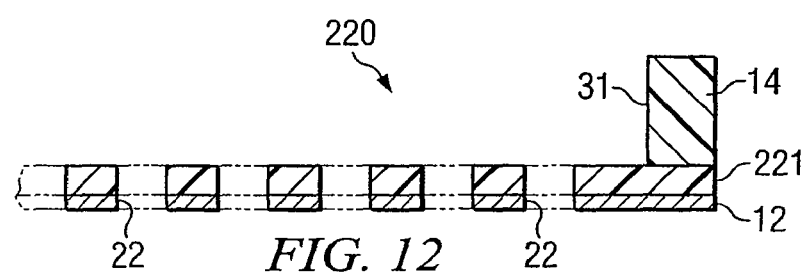

FIG. 12 is a diagrammatic fragmentary sectional side view of a filter 220 which is a further alternative embodiment of the filter 10 of FIG. 1. The filter 220 includes a layer 221 of a dielectric material such as silicon oxide or silicon nitride, which is disposed between the plate 12 and the spacer 14. The dielectric material 221 is 2 to 3 microns thick, and has a plurality of slots through it, which are each aligned with a respective one of the slots in the plate 12.

Figure 13:
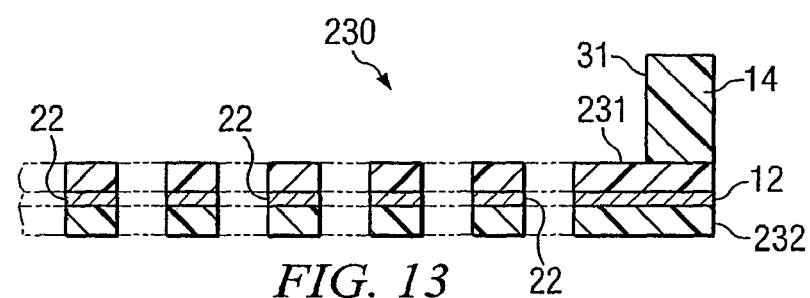

FIG. 13 is a diagrammatic fragmentary sectional side view of a filter 230 which is yet another alternative embodiment of the filter 10 of FIG. 1. The filter 230 has two dielectric layers 231 and 232 which are provided on opposite sides of the plate 12, with the dielectric layer 231 being disposed between the plate 12 and the spacer 14. The dielectric layers 231 and 232 are each made of a material such as silicon dioxide or silicon nitride, and each have a thickness of approximately 2 to 3 microns. The dielectric layers 231 and 232 each have a plurality of slots, and each such slot is aligned with a slot in the plate 12.

Figure 14:
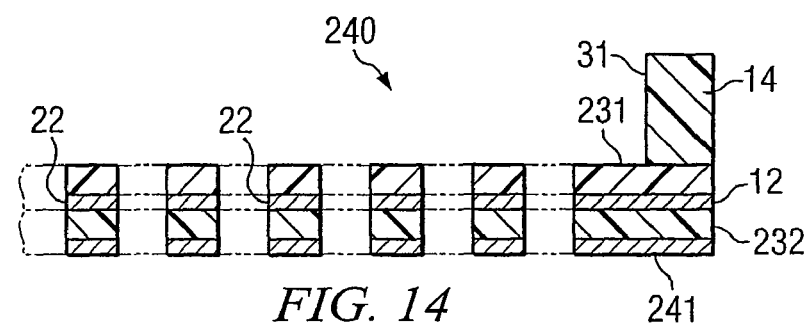

FIG. 14 is a diagrammatic fragmentary sectional side view of a filter 240 which is an alternative embodiment of the filter 230 of FIG. 13. The filter 240 is identical to the filter 230, except that it includes a second gold plate 241, which is identical to the plate 12. The plate 241 is provided on a side of dielectric layer 232 opposite from the plate 12, the slots in the plate 241 being aligned with the slots in the plate 12.

The present invention provides a number of technical advantages. One such advantage is that radiation passes through and is filtered by a portion of a micropolarizing filter which has a total thickness less than approximately one wavelength of the radiation. As a result, the filter avoids certain undesirable optical effects, such as scattering and/or defocusing of the radiation in a manner that produces a degree of cross-talk between adjacent pixel detectors. Since the filter avoids undesirable optical characteristics such as scattering and defocusing, the pitch between the slots can be somewhat larger than for pre-existing filters, which in turn reduces fabrication costs.

A further advantage of the thin filter is that the degree of optical loss within the filter is sufficiently low so as to be virtually negligible. The configuration of the filter also avoids the need for antireflective (AR) coatings intended to reduce reflections and thereby make the filter more optically transparent, which in turn simplifies the fabrication process and reduces the cost of the filter. Since the filter does not need the thick substrate which was present in pre-existing devices, the cost of the substrate is avoided, which in turn reduces the cost of the filter. In addition, since the filter is relatively thin, it is also sufficiently optically transparent to permit it to be rapid and accurate visually aligned with an integrated circuit on which it is to be mounted, thereby avoiding the effort and cost of procedures such as ablating holes through the filter with a laser.

Although selected embodiments have been illustrated and described in detail, it will be understood that various substitutions and alternations are possible without departing from the spirit and scope of the present invention, as defined by the following claims.

What is claimed is:

1. A method of fabricating a polarizing filter, comprising:
   providing a substrate;
   forming a filtering layer over said substrate;
   creating a plurality of openings through a portion of said filtering layer;
   separating said filtering layer from said substrate to remove said substrate; and
   configuring said polarizing filter so that, after said separating of said substrate therefrom, said polarizing filter has throughout a region thereof corresponding to said portion of said filtering layer a maximum physical thickness in a radiation travel direction which is less than approximately one wavelength of radiation to be filtered.

2. A method according to claim 1, including forming a sacrificial layer over said substrate after said providing of said substrate and before said forming of said filtering layer, said forming of said filtering layer being carried out by forming said filtering layer over said sacrificial layer, and said separating being carried out by removing said sacrificial layer.

3. A method according to claim 1, including forming a spacer layer over said filtering layer after said creating of said openings and before said separating of said filtering layer and said substrate, said spacer layer being a part of said polarizing filter.

4. A method according to claim 3, including forming a window through said spacer layer which is aligned with said openings through said filtering layer.

5. A method according to claim 1, including forming a non-filtering layer which is coupled to said filtering layer on one side thereof, said non-filtering layer being a part of said polarizing filter and having a portion which is coupled to said portion of said filtering layer.

6. A method according to claim 5, including forming a further non-filtering layer which is coupled to said filtering layer and which is a part of said polarizing filter, said non-filtering layers being disposed on opposite sides of said filtering layer, and said further non-filtering layer having a portion which is coupled to said portion of said filtering layer.

7. A method according to claim 6, including forming through said portion of each said non-filtering layer a plurality of openings that extend in said radiation travel direction and that are each aligned with a respective one of said openings in said filtering layer.

8. A method according to claim 5, including forming through said non-filtering layer a plurality of openings that extend in said radiation travel direction and that are each aligned with a respective one of said openings in said filtering layer.

9. A method according to claim 5, including forming a further filtering layer which is coupled to said non-filtering layer, which is a part of said polarizing filter, and which has a portion with a plurality of openings extending there through in said radiation travel direction, said filtering layers being disposed on opposite sides of said non-filtering layer, and each said opening in one said filtering layer being aligned with a respective said opening in the other said filtering layer.

10. A method according to claim 9, including forming in said non-filtering layer a plurality of openings that extend there through in said radiation travel direction and that are each aligned with a respective one of said openings in each of said filtering layers.

* * * * *